United States Patent
Hammarlund et al.

(10) Patent No.: US 7,688,746 B2
(45) Date of Patent: Mar. 30, 2010

(54) METHOD AND SYSTEM FOR DYNAMIC RESOURCE ALLOCATION

(75) Inventors: Per H. Hammarlund, Hillsboro, OR (US); Melih Ozgul, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1532 days.

(21) Appl. No.: 10/745,701

(22) Filed: Dec. 29, 2003

(65) Prior Publication Data

US 2005/0141554 A1    Jun. 30, 2005

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)

(52) U.S. Cl. ............... 370/252; 370/468; 370/437

(58) Field of Classification Search .......... 370/468; 395/674, 670, 672; 718/100, 102; 711/136, 711/149; 712/244, 235, 218; 709/225
See application file for complete search history.

(56) References Cited

U.S. PATENT DOCUMENTS

| | | | |
|---|---|---|---|
| 5,696,701 A * | 12/1997 | Burgess et al. | 714/25 |
| 5,826,082 A * | 10/1998 | Bishop et al. | 718/104 |
| 6,496,925 B1 * | 12/2002 | Rodgers et al. | 712/244 |
| 2003/0061258 A1 * | 3/2003 | Rodgers et al. | 709/102 |
| 2003/0120778 A1 * | 6/2003 | Chaboud et al. | 709/225 |
| 2004/0215887 A1 * | 10/2004 | Starke | 711/136 |
| 2004/0215888 A1 * | 10/2004 | Arimilli et al. | 711/136 |
| 2005/0039183 A1 * | 2/2005 | Romero et al. | 718/100 |

* cited by examiner

*Primary Examiner*—Ricky Ngo
*Assistant Examiner*—David Oveissi
(74) *Attorney, Agent, or Firm*—Kenyon & Kenyon LLP

(57) ABSTRACT

Embodiments of the present invention provide a dynamic resource allocator to allocate resources performance optimization in, for example, a computer system. The dynamic resource allocator to allocate a resource to one or more threads associated with an application based on a performance rate. Embodiments of the present invention may further include a performance monitor to monitor the performance rate of the one or more threads. The dynamic resource allocator to allocate an additional resource to the one or more threads, if the thread is performing above a performance threshold. In embodiments of the present invention, the dynamic resource allocation strategy may be decided based on, for example, optimizing the overall system throughput, minimizing power consumption, meeting system performance goals (e.g., real time requirements), user specified performance priorities and/or application specified performance priorities.

30 Claims, 4 Drawing Sheets

METHOD AND SYSTEM FOR DYNAMIC RESOURCE ALLOCATION

TECHNICAL FIELD

The present invention relates to computer systems. More particularly, the present invention relates to allocation of resources between threads in a computer system that supports simultaneous multi threading.

BACKGROUND OF THE INVENTION

A typical computer system consists of several basic components and/or resources, including a processor, volatile and non-volatile memory, and various peripheral devices, including graphics controller(s), mass storage devices, and input/output devices. A chipset connects these computer system components together, and manages the flow of information between them. Known protocols may be used by the computer system for communications among system components.

Moreover, a processor in a computer system may include a plurality of different units such as instruction fetch unit, decode unit, execute unit, memory unit, retirement unit, etc. These units may include an instruction pipeline that processes instructions. These units may contain resources that are allocated for processing threads associated with one or more applications or other program(s) being processed by the system. As a computer system processes the one or more applications, processes or threads associated with these applications may compete for limited resources.

In a multi-threaded micro-architecture processor, these limited resources may be used by multiple threads, or logical processors with hardware support. In a typical processor, some resources may be partitioned so the threads have equal shares while others are fully shared. Inefficiencies may arise when resources are statically partitioned or allocated. For example, if resources are divided equally among threads (e.g. divided in half between two resources), then one thread may optimally utilize its half of the resources while the other thread only partially utilizes its half. This may occur if one thread does not need that particular resource as much as the other does and so its allocation of the resource is wasted while the other thread could use it. If a computer system is not fully using all its resources it may deliver lower overall system performance.

For example, a word processor running on a computer system may compete for resources with a CD (compact disc) player processing audio files on the same system. In this example, the re-order buffer resources may be equally allocated to threads associated with each of these applications. While the word processor application may utilize its cache resources to their maximum extent, the audio application may not need all of the caching resources and under-utilizes these resources. Although the audio application will require sufficient resources so that the application offers good sound quality, some resources allocated for threads associated with the audio application may be wasted.

When resources are fully shared among threads, fairness issues can arise resulting in similar inefficiencies. One thread that allocates the resource faster but not necessarily for the execution of useful micro-ops can take over most of the resource, in expense of the other thread(s) that may be doing more useful tasks.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

Embodiments of the present invention provide a system and method for dynamic resource allocation in a computer system. The invention may provide a technique for allocating resources efficiently so that the system can achieve optimal performance. Embodiments of the present invention provide a system that dynamically allocates resources to, for example, threads so that resources are efficiently and optimally used.

In one embodiment, the invention provides a dynamic allocation of resources for each thread through a feedback system. Inefficiencies encountered by conventional systems may be reduced and the overall performance may be improved while the overall power usage of a multi-threaded microprocessor may be reduced.

Figure 1:
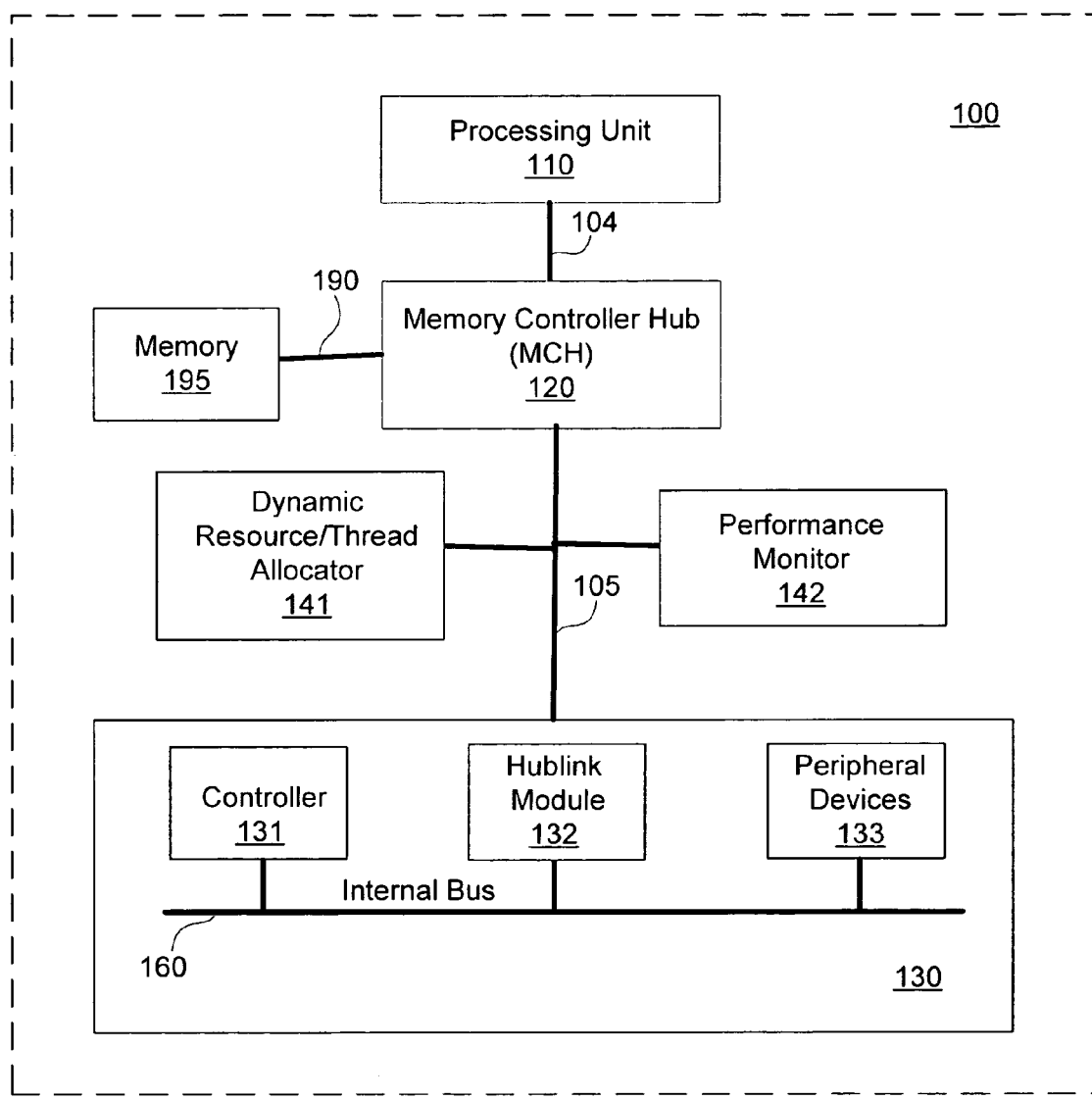
FIG. 1 is a block diagram of a computer system in accordance with an embodiment of the present invention.

FIG. 1 is a partial block diagram of a system 100 in which the embodiments of the present invention find application. As shown in FIG. 1, the system 100 may be a partial representation of computer and/or any other device including these components. System 100 may include a processing unit 110 (processor) connected to a chipset 130 via a memory controller hub (MCH) 120. The processor 110 may be coupled to the MCH 120 using, for example, a host bus 104 and the MCH 120 may be coupled to the chipset 130 using bus 105. The MCH 120 may be coupled to a memory 195 via bus 190. In embodiments of the present invention, bus 105 may be A Peripheral Component Interconnect (PCI) bus, PCI Special Interest Group (SIG) PCI Local Bus Specification, Revision 2.2, published Dec. 18, 1998, high-speed proprietary data bus (e.g., a hub bus) and/or any other proprietary bus.

In accordance with embodiments of the present invention, a dynamic resource/thread allocator (DRA) 141 and/or a performance monitor (PM) 142 may be further coupled to bus 105.

In accordance with embodiments of the present invention, the chipset 130 of computer system 100 may include, for example, a controller 131, hublink module 132, and/or peripheral devices 133. These devices may be coupled to each other via an internal bus 160. The internal bus 160 may be, for example, an ISA (Industry Standard Architecture) bus, a SMBus (System Management Bus), a PCI bus and/or any other type of bus.

It is recognized that chipset 130 and/or system 100 may include additional devices and/or components that have been omitted for simplicity. These may include additional input/output (I/O) interfaces, memories, mass storage devices, etc. The various devices shown in FIG. 1 and/or discussed herein are referred to hereinafter as resources. These resources may, for example, process application threads, instructions, microinstructions, or other data (commonly referred to herein as threads) which may be associated with one or more applications processed by system 100, in accordance with embodiments of the present invention.

In embodiments of the present invention, system 100 includes a plurality of internal and/or external communication buses that connect the various components internal to and/or external to the client 100. These busses may include, for example, host bus 104, PCI or proprietary bus 105, internal bus 160, SMBus 150, PCI bus 138, PCI bus 155 and/or other PCI buses (not shown).

In embodiments of the present invention, the processing unit 110 may be any type of processor such as a Pentium® processor manufactured by Intel Corporation of Santa Clara, Calif. or the like. Memory 195 may be any type of memory such as a static random access memory (SRAM), dynamic random access memory (DRAM), a read only memory (ROM), extended data-out RAM (EDO RAM) and/or any other type of memory.

In embodiments of the present invention, PM 142 may monitor the operating performance of the various resources included in system 100. Moreover, the PM 142 may also observe the performance of application threads, instructions, or the like.

In embodiments of the present invention, the PM 142 may observe that the performance impact of a certain resource for a particular application may have a "good" region where performance may be enhanced if additional resources and/or threads are added to the application. Moreover, the PM 142 may observe a "flat" region where performance may not improve even if more resources and/or threads are allocated. Based on this observation by the PM 142, the DRA 141 may allocate resources and/or threads to optimize performance of the system, in accordance with embodiments of the present invention. Since different applications need different resources, allocating additional resources of a particular kind to one application and additional resources of another kind to another application may optimize the system when processing the particular application.

Thus, take for example the earlier example, where a word processor application and the audio application running on a computer system such as system 100 may compete for similar resources. The PM 142 may monitor, for example, memory resources such as memory or cache, located internal to a processor. If initially, resources are equally allocated to threads associated with each of these applications, the performance monitor may observe that the word processor application may utilize its cache resources to their maximum extent, the audio application may not need all of the caching resources and under utilizes these resources. The PM 142 may pass along its observations to the DRA 141. The DRA 141 with this information and maybe additional data may reallocate resources and/or threads in accordance with the performance of each resource and/or thread. For example, the DRA 141 may incrementally allocate additional memory resources to the threads associated with the word processor application while removing the resources from the threads associated from the audio application.

In embodiments of the present invention, the PM 142, for example, may observe that the performance of the word processor application and/or associated resource is increasing as the additional resources are allocated. As a result, the DRA 141 may continue to allocate additional memory resources to the word processing application until the performance of the application and/or resource reaches a performance threshold. This performance threshold may indicate that the application and/or resource are operating in an optimal or "good" performance region. This performance threshold may be a predetermined threshold and/or may be dynamic threshold that may be periodically evaluated and/or updated by the PM 142 and/or DRA 141. Once the PM 142 determines that the application and/or resource is operating at its operating level, it may inform the DRA 141 to stop allocating additional resources. Alternatively, the DRA 141 may allocate additional resources so that the application and/or resources operate faster and/or in a more efficient manner. In embodiments of the present invention, the PM 142 may continue to monitor the performance of the application and/or resources and the DRA 141 may adjust allocation of resources and/or threads as needed. The DRA 141 may allocate additional resources to increase performance and/or may remove resources and/or threads if additional allocations are not impacting the performance of the application, resource and/or system as a whole.

In embodiments of the present invention, the PM 142 may continue to monitor the resource and/or other application (e.g., audio application) to observe the associated performance level. The DRA 141 may take this information into account as it is removing resources from one application (e.g., the audio application) and reallocating the resources to another application (e.g., the word processing application). The DRA 141 may remove resources from an application up until the application starts to fall below its performance threshold. At this point, the DRA 141 may terminate removing additional resources and maintain the "good" performance region of the application (e.g., the audio application). It is however recognized that the DRA 141 may remove additional resources and/or threads from one application even though the application falls below its performance threshold.

Although DRA 141 and PM 142 are shown as two separate devices, it is recognized that these devices may be incorporated into a single device, in accordance with embodiments of the present invention. Moreover, whether separate or together, DRA 141 and/or PM 142 may be located internal to any of the various devices and/or components of computer system 100. DRA 141 and/or PM 142 may also be located outside of the computer system 100.

In embodiments of the present invention, DRA 141 and/or PM 142 may be used to monitor and/or dynamically allocate resources in more than one computer system. For example, a DRA 141 and/or PM may be applied in a network environment and may monitor and/or allocate resources among one or more computers, one or more servers, one or more storage devices, other devices and/or any combination thereof. The network may be a local-area network (LAN), a wide-area network (WAN), a campus-area network (CAN), a metropolitan-area network (MAN), a home-area network, an Intranet, Internet and/or any other type of computer network. It is recognized that embodiments of the present invention may be applicable to more than one computer that are coupled together in, for example, a client-server relationship or any other type of architecture such as peer-to-peer network architecture. The network may be configured in any known topology such as a bus, star, ring, etc. It is further recognized that network may use any known protocol for communications.

As indicated above, in accordance with embodiments of the present invention, the DRA 141 and/or PM 142 may be incorporated in one or more of the components of a computer system. For example, embodiments of the present invention may be incorporated within a processor such as processor 110.

Figure 2:
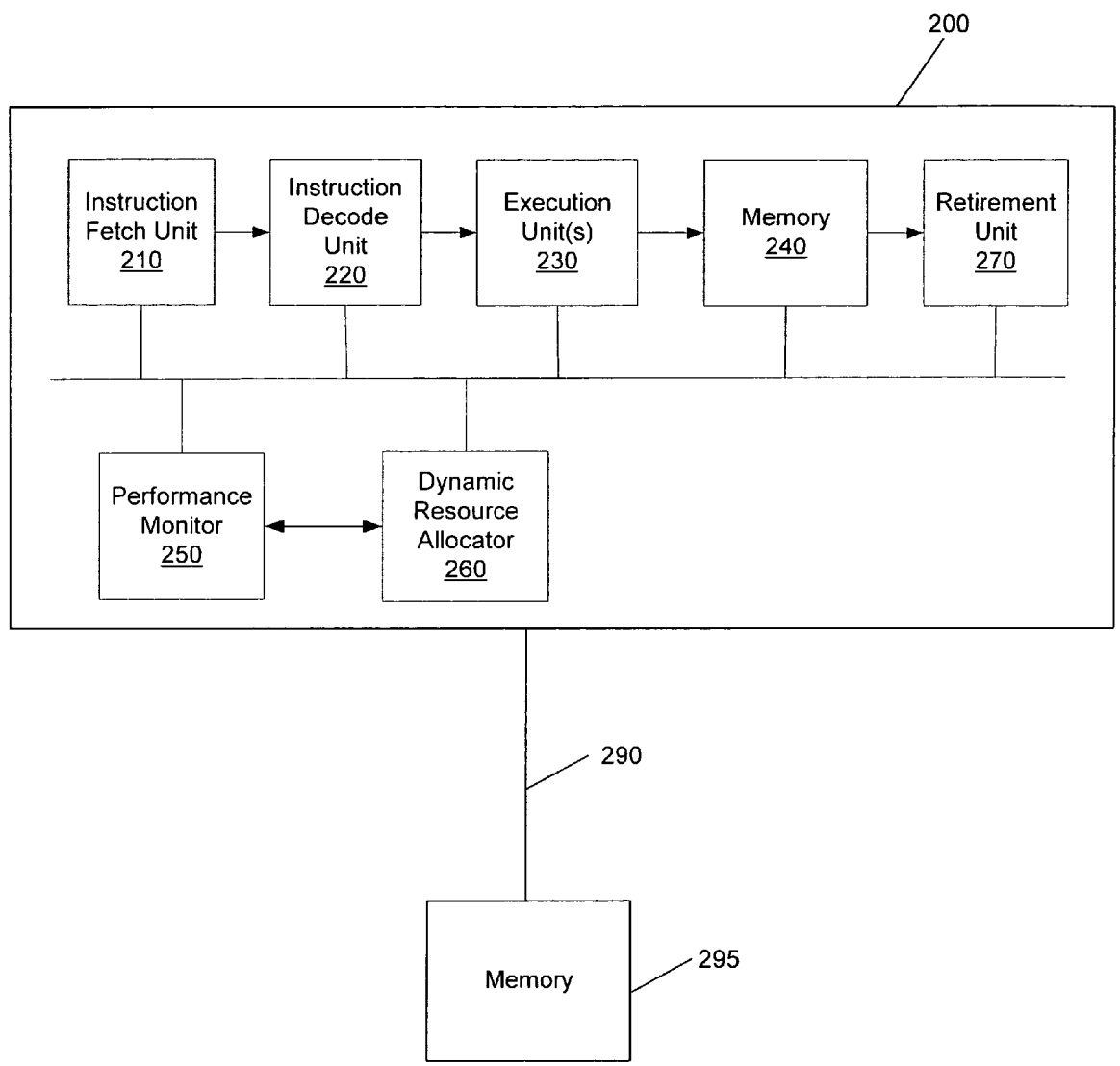
FIG. 2 illustrates a block diagram of a system in accordance with an embodiment of the present invention.

FIG. 2 is a block diagram of a system including a processor 200 coupled to a memory 295 via a bus 290, in accordance with embodiments of the present invention. The processor 200 may be similar to processor 110, shown in FIG. 1, in accordance with embodiments of the present invention. It should be recognized that the block system configuration shown in FIG. 2 and the corresponding description is given by way of example only and for the purpose of explanation in reference to the present invention. It is recognized that the system shown in FIG. 2 may include additional components. Moreover, processor 200 may be configured in different ways and/or may include other components and/or sub-components. The processor 200 may include a plurality of pipeline stages including a plurality of components that may be located at the various stages of the pipeline. Although five units are shown, it is recognized that a processor pipeline can include any number of units or pipeline stages.

In an embodiment of the present invention, the processor 200 may include instruction fetch unit(s) (IFU) 210, instruction decode unit(s) (IDU) 220, instruction execution unit(s) (IEU) 230, memory units(s) (MEM) 240 and retirement unit (s) (RU) 270. The IFU 210 may fetch instructions from a storage location, for example, an instruction cache, and the IDU 220 may decode the instructions. For a Complex Instruction Set Computer ("CISC") architecture, IDU 220 may decode a complex instruction into one or more micro-instructions. Embodiments of the present invention may be practiced for other architectures, such as Reduced Instruction Set Computer ("RISC") or Very Large Instruction Word ("VLIW") architectures. It is to be noted that no distinction is made between instructions and micro-instructions unless otherwise stated, and are simply referred to herein as instructions.

In embodiments of the present invention, the IFU 210 may fetch instruction byte(s) from memory and place them in a buffer until the bytes are needed. The instruction decode unit 220 may fetch and decode the instruction by determining the instruction type and/or fetch the operands that are needed by the instruction. The operands may be fetched from the registers or from memory. The IEU 230 may execute the instruction using the operands. The MEM unit 240 may store the operands and/or other data. The RU 240 may retire the instructions as they are processed, in accordance with embodiment of the present invention.

It is recognized that pipeline stages shown in the processor 200 represent a variable number of stages which may lie between IFU 210 and MEM 270. As processor frequency is increased, the number of stages in processor 200 may increase. This increasing prediction resolution time will cause increasing penalty when speculation is incorrect.

In embodiments of the invention, a performance monitor (PM) 250 and/or a dynamic resource allocator (DRA) 260 may be coupled to the processor 200. The PM 250 may monitor, for example, the performance and/or processing status of the various components (resources) included in the processor 200. As indicated above, the components shown in processor 200 are given by way of example only and that processor 200 may include additional components that have been omitted for simplicity. Performance monitor 250 may be similar to and/or include the same functionality as PM 142, described above. DRA 260 may be similar to and/or include the same functionality as the dynamic resource allocator 141, described above.

In embodiments of the present invention, for example, PM 250 may monitor the performance of resources such as one or more IFUs 210, IDUs 220, etc. located in the processor 200. For example, the PM 250 may, for example, generate a performance-resource curve associated with each resource or the like. Based on the resource-performance curve, the PM 250 may determine a good performance region as well as a flat region of operation. The PM 250 may observe the performance impact on the resources for one or more applications. For example, the PM 250 may monitor the performance impact as the IFU 210, for example, process instructions such as micro-instructions associated with an application. As the PM 250 monitors the performance of the various resources, it may provide this performance information to the DRA 260. Based on the information received from the PM 250 and/or performance threshold levels, the DRA 260 may allocate resources to the instructions and/or allocate instructions to the resources to optimize performance, for example.

In one example, if an application is running in its good performance range (e.g., at or above a performance threshold), the DRA 260 may allocate additional resources to the application. For example, the DRA 260 may assign one or more additional IEUs 230 to the application. If the performance rating associated with the application improves, additional resources may be allocated to the application. If however, the performance rating associated with the application remains flat or does not improve (e.g., falls below a performance threshold), the DRA 260 may cease to allocate additional resources to the application. In embodiments of the present invention, the DRA 260 may even de-allocate and/or remove resources associated with the application so that the performance of the application returns or remains at or above a performance threshold.

In another example, if one of the components such as IFU 210 in the processor 200 is operating in the "good" performance (e.g., above a performance threshold), the DRA 260 may allocate additional instructions such as micro-instructions to the resource. If, as a result of the additional instruction allocation, the performance rating associated with the resource improves, additional instructions may be allocated to on or more resources. If however, the performance rating associated with the resource remains flat or does not improve (e.g., falls below a performance threshold), the DRA 260 may cease to allocate additional instructions to the application. In embodiments of the present invention, the DRA 260 may even de-allocate and/or remove instructions associated with the resource so that the performance of the resource returns or remains at or above a performance threshold.

Figure 3A:
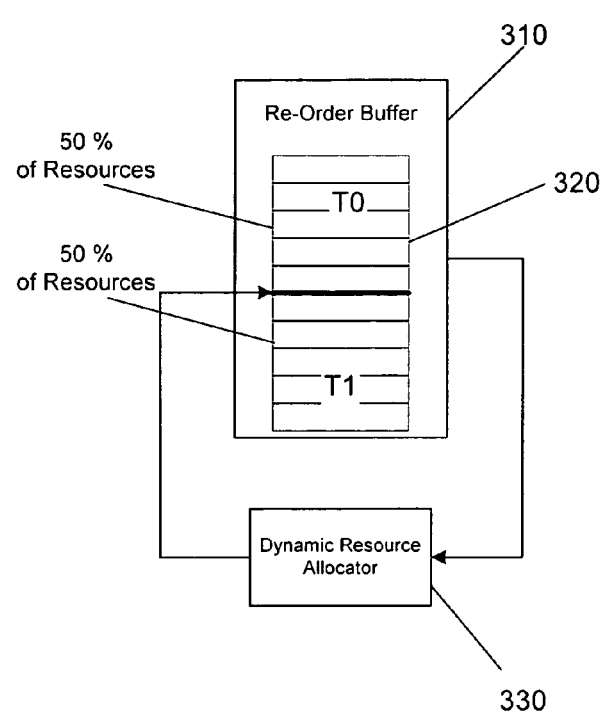
FIGS. 3A and 3B illustrate detailed block diagrams in accordance with an embodiment of the present invention.
Figure 3B:
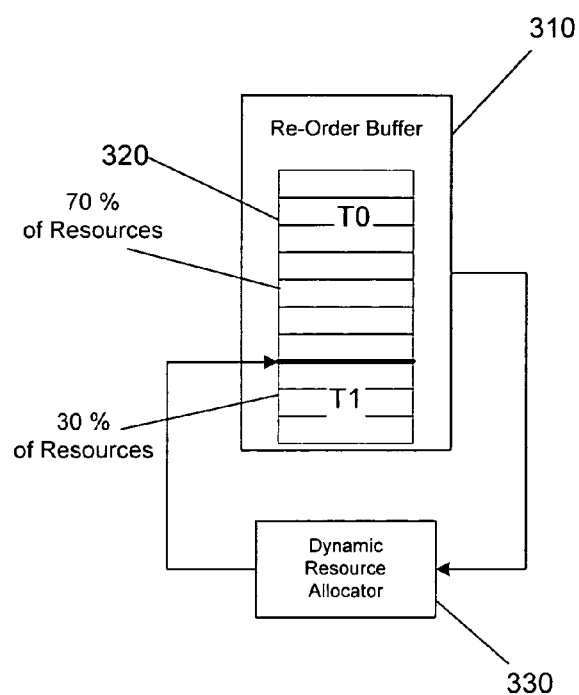

FIGS. 3A and 3B illustrate block diagrams in accordance with embodiments of the present invention. FIGS. 3A and 3B show how a dynamic resource allocator 330 may allocate resources in a re-order buffer (ROB) 310, in accordance with an embodiment of the present invention. The ROB 310 may be included in an IEU 230 or another component of processor 200. It is recognized that processor 200 may include additional components or devices. It is recognized that the dynamic resource allocator 330 may be used to dynamically allocate resources to any number of different components and/or devices.

In embodiments of the present invention, the re-order buffer 310 may include a plurality of resources 320 that may be allocated by the dynamic resource allocator 330 to threads T0 (thread zero) and T1 (thread one). In the example provided, the added logic may control the allocation limits of each thread in the ROB. For simplicity, only two threads (e.g., T0 and T1) are shown in FIGS. 3A and 3B, however it is recognized that resources may be allocated among any number of threads. In other words, the dynamic resource allocator 330 may allocate resources among three, four or more threads.

In embodiments of the present invention, the performance of each thread is monitored by the logic included in the allocator 330. In one example, the allocator may monitor the micro-operation instruction retirement rate (uops per clock) calculated as a running average over a certain number of clocks. Based on this information, for example, the allocator may apply one or more dynamic allocation strategies as described herein.

In embodiments of the present invention, the dynamic resource allocator (e.g., allocator 260 and/or 330) may use other criteria to monitor and/or allocate resources dynamically. For example, it is recognized that the overall system performance may be monitored and resources may be allocated to optimize system throughput. In another example, resources may be allocated based on real time requirements such as real time performance thresholds or the like. In yet another example, resources may be applied based on user defined specifications, and/or based on specifications and/or requirements of the application being processed.

In embodiments of the present invention, the dynamic allocator 330 may observe that the performance impact of a thread may have a "good" region in the resource allocation curve where performance may be enhanced if additional resources are provided to the thread. Moreover, the dynamic allocator 330 may observe a "flat" region where performance may not improve even if more resources are assigned. Based on this observation, the allocator 330 may allocate resources to threads to optimize performance of the system, in accordance with embodiments of the present invention. Since different applications need different resources, allocating additional resources of a particular kind to one thread and additional resources of another kind to another thread may optimize the system when a particular kind of application is being processed.

In embodiments of the present invention, the allocator 330 may observe that resources 320 may be equally allocated to threads T0 and T1. In other words, 50% of the resources 320 of ROB 310 may be allocated to thread T0 and 50% of the resources 320 may be allocated to thread T1. In this example, one thread is execution bound but may have a high rate of branch misprediction, it will keep filling its ROB resources 320 with micro-operations (uops) that are frequently flushed. If another thread also being processed by ROB 310, may have frequent bus accesses and may permit other uops to execute between the bus accesses. Performance of the ROB 310 may be improved if resources are taken away from the first thread and are allocated to the second thread. The allocator may accomplish this by, for example, monitoring the retirement rate of the threads with increased resources.

In embodiments of the present invention, the dynamic allocator may observe that the performance of a thread is increasing as additional resources are allocated. As a result, it may continue to allocate additional resources to the thread until its performance reaches at or above a performance threshold, or a flat region. This performance threshold may indicate that the thread is running in an optimal or "good" performance region. This performance threshold may be a pre-determined or it may be a dynamic threshold that is periodically evaluated and updated by the allocator. Once it determines that the thread is operating at its optimal level, it may stop allocating additional resources. Alternatively, the allocator 330 may allocate additional resources so that the application and/or resources operate faster and/or in a more efficient manner. In embodiments of the present invention, the allocator continues to monitor the performance of the thread and adjusts the allocation of its resources as needed.

In embodiments of the present invention, as shown in FIG. 3B, the allocator 330 may allocate 70% of the resources 310 to thread T0 and may only allocate 30% of the resources to thread T1. In embodiments of the present invention, the allocator can remove resources from thread T1, either to be able to provide them to another thread such as T0 that can utilize the resource more efficiently or to conserve power by taking out of the available pool an underutilized portion of resources until the thread starts to lose performance At this point, the allocator 330 may terminate removing resources and even give back some of the resources to restore and maintain the "good" performance region of the thread.

In embodiments of the present invention, it is recognized that the allocator 330 may remove additional resources and/or threads from one application. For example, if there are five (5) active threads, three (3) threads may be allocated to the word processor application. The allocator 330 may recognize that the threads allocated to the word processor may be reduced to two (2) or even one (1). Accordingly, the allocator 330 may remove threads from the word processor and reallocate the threads to another program or application. The allocator 330 may recognize that the resources may be reallocated without impacting the word processor, for example. Moreover, the resources may be reallocated to increase the overall throughput of the system or as designated by the user and/or by the application.

It is recognized that the allocator 330 may include the features and/or functionality of the PM (e.g., PM 142 and/or PM 250) and/or the DRA (e.g., DRA 141 and/or 260). It is further recognized that allocator 330 may be separated in to two devices (such as a PM and a DRA) and/or may remain a single device that performs the functionality of both devices. In embodiments of the present invention, allocator 330 may be located internal to and/or external to a component such the ROB 310.

In embodiments of the present invention, for example, the dynamic resource allocator 330 may monitor the performance of resources such as, but not limited to, ROB, memory ordering load and store buffers, a scheduler, fill request buffers, the bus queue, hardware prefetcher queue, instruction streaming buffers, translation lookaside buffer, caches, etc. The allocator may, for example, generate a performance-resource curve associated with each resource or the like. Based on the resource-performance curve, it may determine a good performance region as well as a flat region of operation. Based on this information, the allocator may allocate resources to the instructions and/or allocate instructions to the resources to optimize performance, for example.

In one example, if a thread is running in its good performance range (e.g., at or above a performance threshold), the allocator may allocate additional resources to the thread. If the performance of the thread improves, additional resources may be allocated to it. If however, the performance remains flat or does not improve (e.g., falls below a performance threshold), the allocator may cease to allocate additional resource to the application. In embodiments of the present invention, the allocator may even de-allocate and/or remove resources associated with the application so that the performance of the thread returns or remains at or above a performance threshold.

Figure 4:
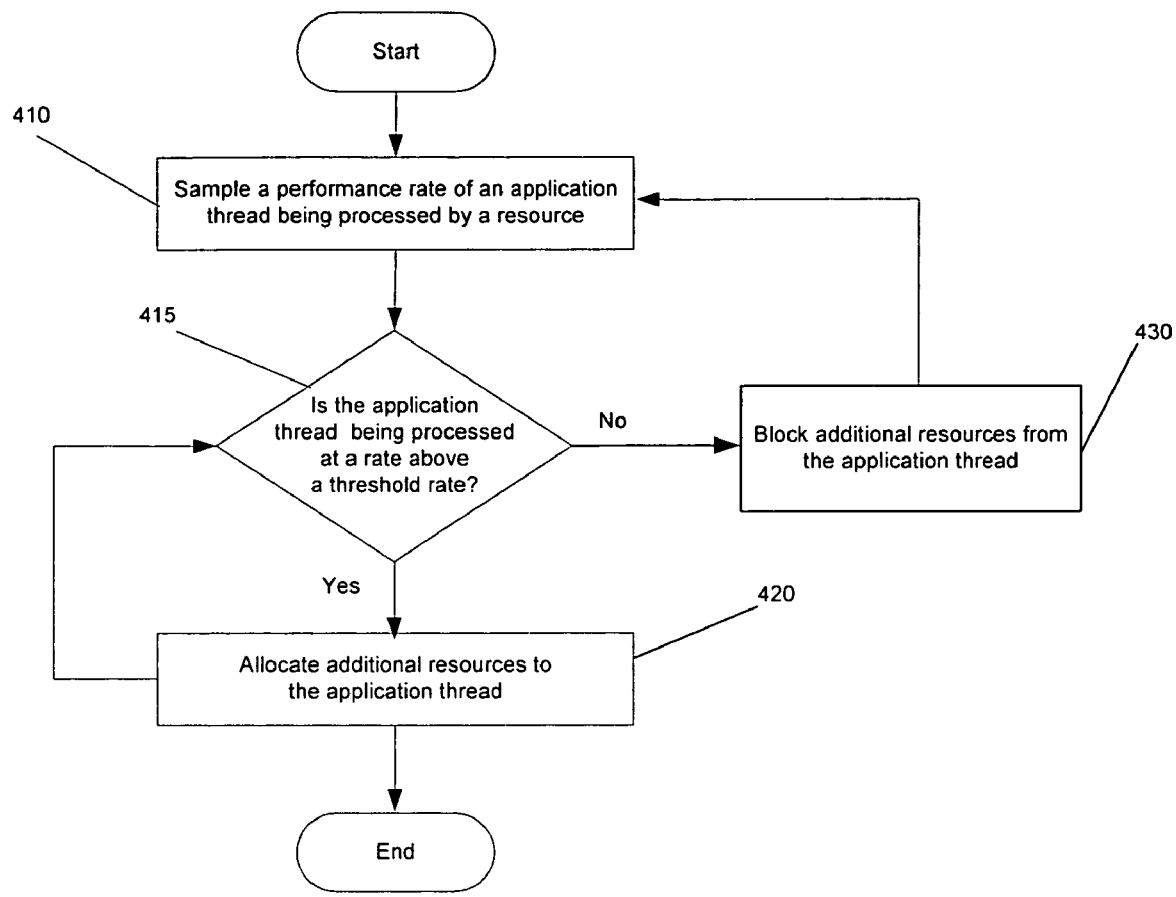
FIG. 4 is a flow chart illustrating a method in accordance with an embodiment of the present invention.

FIG. 4 is a flowchart illustrating a method in accordance with an embodiment of the present invention. In an embodiment of the present invention, the performance rate of an application thread being processed by a resource may be sampled, as shown in box 410. If the application thread being processed at a rate above a threshold rate, additional resources may be allocated to the application thread, as shown in boxes 415 and 420.

In embodiments of the present invention, if the application thread is not being processed at a rate above a threshold rate, blocking additional resources from the application thread, as shown in boxes 415 and 430.

In embodiments of the present invention, the dynamic resource allocation strategy may be decided based on, for example, optimizing the overall system throughput, minimizing power consumption, meeting system performance goals (e.g., real time requirements), user specified performance priorities and/or application specified performance priorities.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An apparatus comprising:
a performance monitor to monitor a performance rate of a plurality of threads associated with one or more applications, a plurality of resources being allocated to the threads; and
a dynamic resource allocator to determine a flat performance region for each thread operating in a respective resource, adjust allocation of the respective resource among the threads based on the monitored performance rate, wherein the adjustment of allocation of the respective resource includes removing portions of the respective resource from a first thread until the first thread starts to lose performance and adding at least a portion of the removed portions to a second thread until the performance of the second thread reaches the flat performance region for the second thread.

2. The apparatus of claim 1,
wherein the performance rate is a micro-operation instruction retirement rate.

3. The apparatus of claim 1, wherein the dynamic resource allocator is to generate a performance curve associated with each resource and determine a flat performance region for each resource.

4. The apparatus of claim 3, wherein the dynamic resource allocator is to allocate additional threads to a resource if the performance of the resource has not reached the flat performance region and remove threads from the resource if the performance of the resource until the resource staffs to lose performance.

5. The apparatus of claim 1, further comprising:
a re-order buffer coupled to the dynamic resource allocator, wherein at least one of resources is a re-order buffer resource and the re-order buffer is to process the threads.

6. The apparatus of claim 1, further comprising:
a memory ordering buffer coupled to the dynamic resource allocator, wherein at least one of the resources is a memory ordering buffer resource and the memory ordering buffer is to process the threads.

7. The apparatus of claim 1, further comprising:
a translation lookaside buffer coupled to the dynamic resource allocator, wherein at least one of the resources is a translation lookaside buffer resource and the translation lookaside buffer is to process the threads.

8. The apparatus of claim 1, further comprising:
an instruction streaming buffer coupled to the dynamic resource allocator, wherein at least one of the resources is a instruction streaming buffer resource and the instruction streaming buffer is to process the threads.

9. A method for dynamically allocating resources in a computer system, comprising:
allocating resources of the computer system to a plurality of threads running in the computer system;
determining a flat performance region for each thread operating in a respective resource;
sampling a performance rate for each thread being processed by the respective resource;
adjusting allocation of the respective resource among the threads based on the sampled performance rate, wherein the adjustment of allocation of the respective resource includes removing portions of the respective resource from a first thread until the first thread staffs to lose performance and adding at least a portion of the removed portions to a second thread until the performance of the second thread reaches the flat performance region for the second thread.

10. The method of claim 9, further comprising:
if the second thread has not reached the flat performance region, allocating additional resources other than the removed portions to the second thread.

11. The method of claim 9, wherein the performance rate is a micro-operation instruction retirement rate.

12. The method of claim 9, wherein the performance rate is a throughput of the computer system.

13. The method of claim 9, wherein the performance rate is a user defined performance rate.

14. The method of claim 9, wherein the performance rate is an application dependent performance rate.

15. A method comprising:
allocating one or more threads running in a computer system to a resource of the computer system;
monitoring performance of the resource in the computer system;
generating a performance curve associated with the resource;
determining a flat performance region for the resource;
determining whether the resource is performing in the flat performance region; and
adjusting allocation of the resource among the threads based on a monitored performance rate for each thread operating in the resource, wherein the adjustment of allocation of the resource includes removing portions of the resource from a first thread until the first thread starts to lose performance and adding at least a portion of the removed portions to a second thread until the performance of the second thread reaches a flat performance region for the second thread.

16. The method of claim 15, further comprising:
blocking a thread from being allocated to the resource, if the resource is performing at the flat performance region.

17. The method of claim 15, further comprising:
removing a thread from the resource, if the removal does not cause the resource to lose performance.

18. The method of claim 15,
wherein the good performance region is indicated by a performance threshold.

19. The method of claim 18,
wherein the performance threshold is one of a pre-determined threshold, and a dynamic threshold evaluated and updated periodically.

20. The method of claim 15, wherein performance of the resource is measured by a number of instruction per cycle that are processed by the resource.

21. A system comprising:
a processor;
a bus;
a performance monitor to monitor a performance rate of a plurality of threads associated with one or more applications being executed by the processor; and
a dynamic resource allocator coupled to the processor and the performance monitor via the bus, wherein the dynamic resource allocator is to allocate resources of the processor to the threads, determine a flat performance region for each thread operating in a respective resource, adjust allocation of the respective resource among the threads based on the monitored performance rate, wherein the adjustment of allocation of the respective resource includes removing portions of the respective resource from a first thread until the first thread staffs to lose performance and adding at least a portion of the removed portions to a second thread until the performance of the second thread reaches the flat performance region for the second thread.

22. The system of claim 21, wherein the dynamic resource allocator is to allocate additional resources to a respective thread if the performance of the respective thread has not reached the flat performance region of the respective thread.

23. The system of claim 21, wherein the performance monitor further monitors a performance rate of the resources allocated to the threads.

24. The system of claim 23, wherein the dynamic resource allocator is to generate a performance curve associated with each resource, determine a flat performance region for each resource, allocate additional threads to a resource if the performance of the resource has not reached the flat performance region for the resource and remove threads from the resource until the resource starts to lose performance.

25. The system of claim 21, wherein the performance rate is a throughput rate of the processor.

26. A system comprising:
   a bus;
   an external memory coupled to the bus, wherein the external memory is to store a plurality of instructions; and
   a processor coupled to the memory via the bus, the processor including:
   a performance monitor to monitor a performance rate of a plurality of threads associated with the plurality of instructions, the threads being executed by the processor; and
   a dynamic resource allocator, wherein the dynamic resource allocator is to allocate a resource of the processor to the threads, to determine a flat performance region for each thread operating in the resource, and to adjust allocation of the resource among the threads based on the monitored performance rate, wherein the adjustment of allocation of the resource includes removing portions of the resource from a first thread until the first thread starts to lose performance and adding at least a portion of the removed portions to a second thread until the performance of the second thread reaches the flat performance region for the second thread.

27. The system of claim 26, wherein the dynamic resource allocator is to allocate additional resources to a respective thread if the performance of the respective thread has not reached the flat performance region of the respective thread.

28. The system of claim 26, wherein the performance monitor further monitors a performance rate of the resource allocated to the threads.

29. The system of claim 28, wherein the dynamic resource allocator is to generate a performance curve associated with each resource, determine a flat performance region for each resource, allocate additional threads to a resource if the performance of the resource has not reached the flat performance region for the resource and remove threads from the resource until the resource staffs to lose performance.

30. The system of claim 26, wherein the performance rate is a throughput rate of the processor.

* * * * *